Oct. 13, 1942.  H. W. LEVERENZ  2,298,947
LUMINESCENT LAMP
Filed July 31, 1940  2 Sheets-Sheet 1
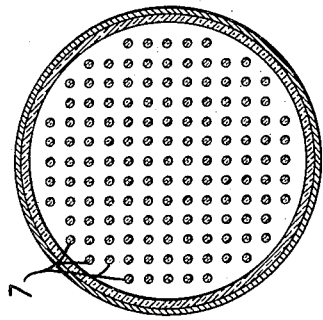
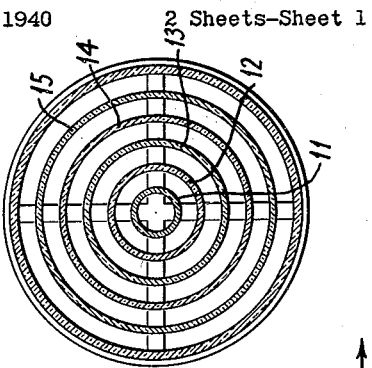
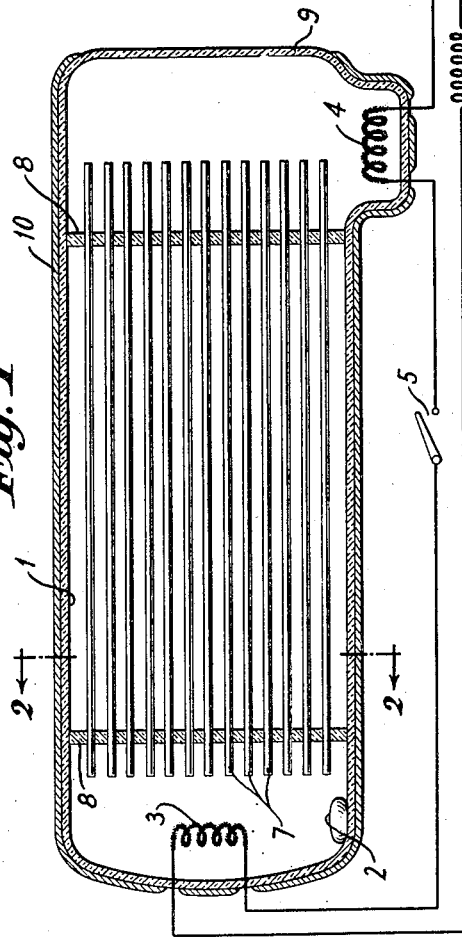
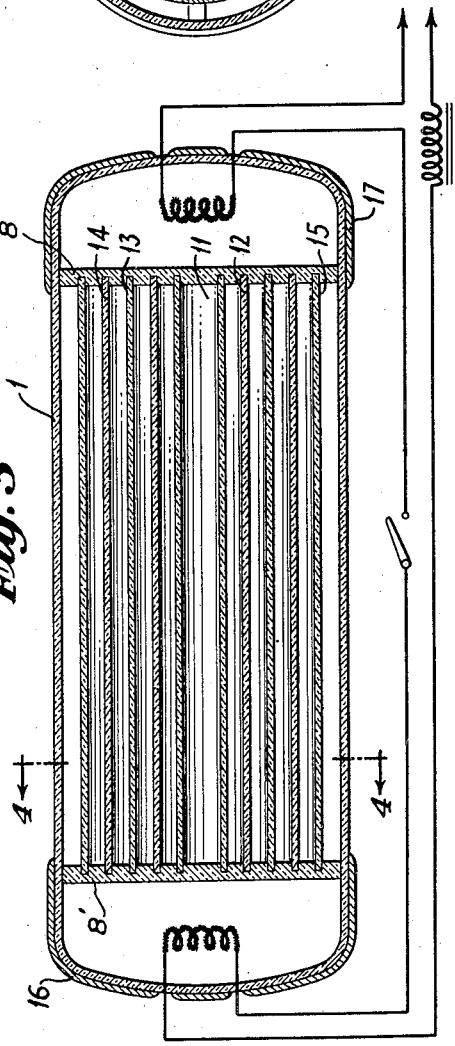
INVENTOR
HUMBOLDT W. LEVERENZ
BY *Charles McClair*
ATTORNEY Oct. 13, 1942.    H. W. LEVERENZ    2,298,947
LUMINESCENT LAMP
Filed July 31, 1940    2 Sheets-Sheet 2
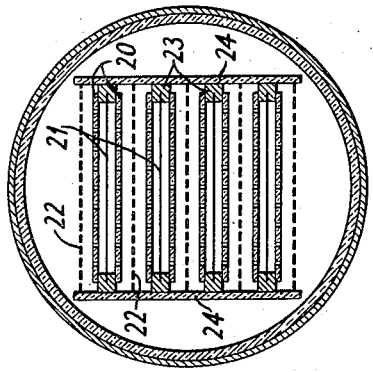
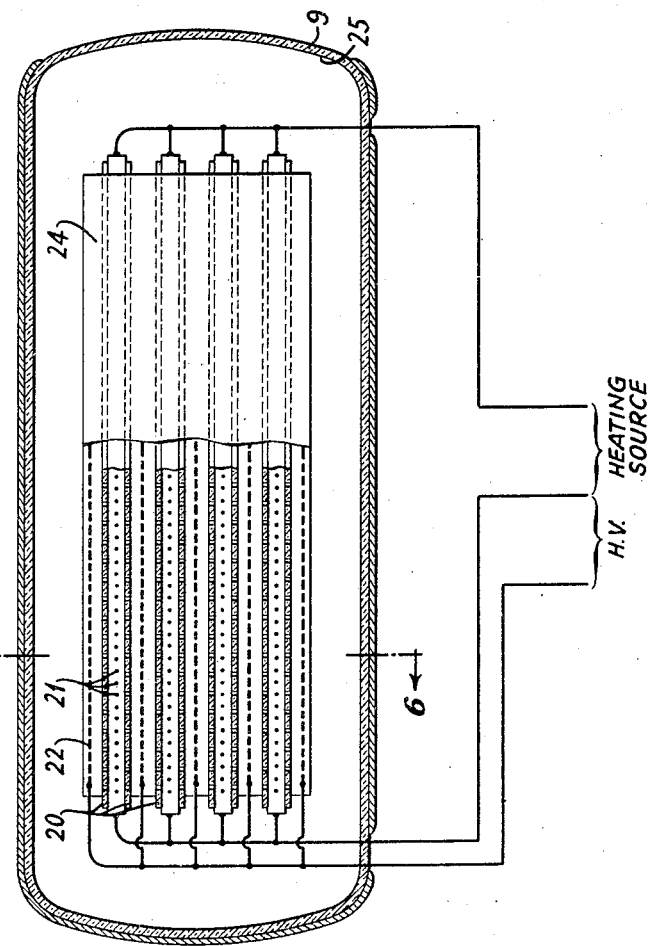
INVENTOR
HUMBOLDT W. LEVERENZ
BY Charles McClair
ATTORNEY Patented Oct. 13, 1942

2,298,947

UNITED STATES PATENT OFFICE 2,298,947

LUMINESCENT LAMP

Humboldt W. Leverenz, South Orange, N. J., assignor to Radio Corporation of America, a corporation of Delaware Application July 31, 1940, Serial No. 348,790

11 Claims. (Cl. 176—122)

My invention relates to luminescent lamps and particularly to a new type of lamp having high intrinsic brilliance and to the manufacture of phosphor bodies or members for use in such lamps.

Luminescent lamps are known wherein a coating of finely divided phosphor or luminescent material is provided on the interior surface of an envelope, which material upon excitation by corpuscular or radiant energy, becomes luminescent and fluoresces with a soft luminescent glow. The intrinsic brilliance of such devices is quite low and they are not adapted for the production of light of high intrinsic brilliance. A further disadvantage of such lamps resides in the fact that the luminescent material which is in finely divided powdered form absorbs as well as diffuses a considerable proportion of the emitted light.

Objects of my invention include providing luminescent lamps of exceptionally high intrinsic brilliance; lamps of high intrinsic brilliance having a wide range of colors or band spectrum emission within the ultra violet, visible and infra red portions of the spectrum; lamps of exceptionally high intrinsic brilliance which operate at low temperatures whereby the use of cooling means such as circulating air or water is avoided, and visible radiation luminescent lamps excited by invisible luminescent radiation. Further objects of my invention include the provision of lamps of the type described having high intrinsic brilliance without rapid destruction of the luminescent material and lamps wherein a combination of non-directional with highly directional light propagating properties may be obtained in a single lamp and wherein the single lamp is capable of producing a wide variety of colors. Still further objects of my invention are to provide luminescent lamps having high output energy levels within both the visible and invisible portions of the spectrum and fluorescent screens of novel type in combination with lamps producing ultra violet radiation whereby any desired colored light may be obtained.

While my invention is particularly directed to luminescent lamps of high intrinsic brilliance, my invention also relates to the manufacture of luminescent materials and luminescent members for use in my improved types of lamps. It is therefore a further object of my invention to provide a method of manufacturing luminescent materials and luminescent members particularly, although not exclusively, for lamp use and with which exceptionally high intrinsic brilliancies may be obtained.

In accordance with my invention I provide a fluorescent lamp excitable by corpuscular energy such as alpha-particles, mercury vapor discharge, vapor-rare gas discharge, electron discharge, or by radiant energy such as ultra violet radiation, radioactive disintegration products, X-rays or combinations thereof, wherein the material which becomes excited under the incident energy comprises elongated phosphor bodies of luminescing solids. Further in accordance with my invention I provide means to utilize the cumulative effect of a plurality of luminescing solids comprising transparent phosphor members and/or an extended excitation volume in a transparent luminescent solid. Still further in accordance with my invention I provide a new form of fluorescent member and a method of manufacturing the materials comprising such members whereby large elongated crystals of solid phosphor are obtained. These and other objects, features and advantages of my invention will become apparent to those skilled in the art when considered in view of the following description and the accompanying drawings in which:

Fig. 1 is a longitudinal cross-sectional view and schematic circuit of one form of luminescent lamp made in accordance with my invention;

Fig. 2 is a cross-section of the lamp shown in Fig. 1 taken along the lines 2—2;

Figs. 3 and 4 are views similar to Figs. 1 and 2 showing a further modification of my invention, and Figs. 5 and 6 are views similar to Figs. 1 and 2 of a lamp particularly adapted for electron discharge excitation.

The lamp shown in Figs. 1 and 2 is particularly adapted for producing high intensity light beams such as for search-light use or other applications requiring a high concentration of light from a source of high intrinsic brilliance and is of the mercury vapor-rare gas discharge type, although other forms of excitation later to be described may be used in combination with the particular structure shown in Fig. 1. The lamp of Fig. 1 comprises an elongated evacuated envelope I containing a rare gas such as argon and a quantity of mercury 2 which, during operation, becomes vaporized and supports an electric discharge between two electrodes 3 and 4 preferably located at opposite ends of the envelope I. The electrodes 3 and 4 are preferably of the filamentary Wehnelt type, each being provided with a coating of barium and/or strontium oxides. The filamentary electrodes 3 and 4 are preferably connected in series with an interrupter 5 and to a source of alternating or direct current through a reactor 6. The interrupter 5 may be of the normally closed mechanical or electro-mechanical type or of the normally open gaseous conduction bi-metallic type, and in operation a flow of current through the electrodes 3 and 4 produces localized electron discharges which vaporize a portion of the mercury 2. Upon opening of the interrupter 5 a voltage surge is produced between the electrodes 3 and 4 by reason of the collapse of the magnetic field in the reactor 6, thereby initiating a discharge in the rare gas, further vaporizing the quantity of mercury 2 and starting the vapor discharge between the electrodes 3 and 4.

In accordance with my invention I provide within the envelope 1 and exposed to the discharge therein successively arranged luminescing solids comprising transparent phosphor bodies having an extended excitation volume. In the lamp of Figs. 1 and 2 the luminescing solids comprise transparent rods 7 of activated phosphors suitably supported so as to have a maximum area exposed to the exciting discharge. More particularly, the rods 7 may be supported at their opposite ends by spacers 8 which maintain the rods 7 separated one from another so as to expose the maximum area of the rods to the discharge. The rods 7 are preferably of small diameter, such as from one to ten millimeters, and are composed of solid transparent preferably single crystal phosphors such as zinc sulfide, zinc cadmium sulfide, magnesium tungstate, zinc or cadmium borate, cadmium chloro-phosphate, zinc or cadmium sulphate, zinc silicate or zinc beryllium silicate with suitable activators. All of these phosphors are of the crystalline type and are transparent to their own luminescence emission wave length. The rods and other forms which the phosphor bodies may take are relatively long with respect to their diameter. The ratio of maximum dimension, such as their length, to the minimum dimension, such as diameter or minimum thickness, should preferably be no less than 5 to 1, although a ratio of 3 to 1 may be sufficient especially where a plurality of rods placed end to end are used. With these or greater ratios of length to minimum dimension the length is sufficient to exhibit total internal reflection of light predominantly along and within the length of the phosphor members, such as the rods 7. The rods 7 may be subdivided into shorter lengths and supported end to end, although this increases the internal reflection losses at the adjacent ends of the members. By single crystal is meant a crystal of both perfect and imperfect symmetry, and therefore this term includes a twin crystal, especially twinning of the interpenetration type which produces a minimum of optical inhomogeneity.

The spacers 8 insure exposure of the rods to sufficient volume of exciting gas or vapor for adequate excitation of the volume of the rods and along their lengths. The length of the rods 7 depends on the desired intrinsic brilliance, and since the brilliancy obtained is a cumulative effect of continuously excited long transparent phosphor bodies, brilliancies in excess of $10^{10}$ foot-lamberts may be obtained. The light from the lamp of Fig. 1 for projection as a narrow beam is preferably projected through the transparent end wall 9 of the envelope 1, and to further increase and concentrate the light from the fluorescent rods 7 the entire envelope 1 with the exception of the end wall 9 may be silvered or otherwise made reflective to light such as by coating the exterior surface of the envelope with a light reflecting layer 10. However, if the lamp is designed for general illumination, the envelope 1 may be left uncoated or coated only on desired areas depending upon the particular lighting application desired. When a single lamp is to be used for both directional and nondirectional lighting, the layer 10 may be eliminated or used over only one end of the lamp.

The choice of materials of which the rods 7 are composed is determined to a great extent by the color of light desired and the type of excitation, whether it be a mercury discharge, a glow discharge in gas, such as neon, argon, helium, tellurium or other gas or vapor, an electron discharge or radiant energy excitation produced by very short ultra violet light, X-rays, etc. Thus for excitation by a low pressure mercury vapor discharge, which produces a maximum ultra violet radiation at 2537 Angstroms, zinc beryllium silicate activated with manganese, magnesium tungstate, or others having high energy absorption characteristics and luminescent activity at this wave length is ideally suited. However, if the discharge is of the high pressure mercury vapor type, materials such as various sulfides such as silver activated zinc sulfide are preferable, since the maximum convertible energy of such a discharge lies around 3650 Angstroms, at which point materials such as zinc sulfide have high energy absorption and luminescent activity. Thus even though the spectral distribution of the individual materials is the same under all types of excitation, maganesium tungstate, zinc beryllium silicate, zinc silicate, cadmium borate, cadmium chloro-phosphate, zinc germanate luminescent materials are far more efficient under low pressure mercury discharges, whereas zinc sulfide, zinc cadmium sulfide, zinc sulpho-selenide, calcium sulfide materials are more efficient under high pressure mercury discharges.

Referring to Figs. 3 and 4, which show another form of fluorescent lamp made in accordance with my invention, instead of using the solid transparent luminescent members in the form of the rods 7 I provide these members as concentric cylinders 11—15. These cylinders are preferably formed of solid material, although they may be formed by segments of cylinders arranged longitudinally and concentrically about a longitudinal axis which is preferably the axis of the envelope 1. The cylinders of Figs. 3 and 4 may be supported within the envelope by the supports 8' which may be of material which is transparent for the particular wave length of light generated in the lamp. While the supports 8' are shown as being located at the ends of the cylinders, the cylinders may be supported by concentric rings intermediate the ends, which is desirable in a lamp for beam projection. As in the case of the lamp of Figs. 1 and 2 the material of the cylinders 11—15 is chosen with respect to the form of excitation and the color of the generated light desired. The number of cylinders may be varied depending on the intensity of light desired, the five cylinders shown being representative of any plurality of such cylinders, and in fact, one of the phosphor cylinders may form the envelope enclosing any additional cylinders if desired.

Since the cylinders 11—15 are substantially transparent, the lamp of Figs. 3 and 4 is ideally suited as a nondirectional source of high intrinsic brilliance illumination and the envelope 1 may be left uncoated for general illumination, or various sections of the envelope may be provided with light reflecting coatings 16—17 as desired.

While I have described in connection with Figs. 1-4 a lamp of the low pressure mercury vapor-gas discharge type, the modification of my luminescent lamp of high intrinsic brilliance shown in Figs. 5 and 6 is directed to the use of electron discharge excitation of the solid single crystal elongated phosphor bodies. Referring to Figs. 5 and 6, I have provided a lamp wherein the solid fluorescent bodies, instead of being formed as rods as shown in Fig. 1, or as cylinders in Fig. 3, are of sheet-like formation and are excited by an electron discharge. Thus the transparent solid phosphor bodies may comprise thin plates 20 which are preferably of rectangular shape supported within the envelope 1 with spaces therebetween. The envelope 1 may be evacuated and provided with a low pressure gas filling to supplement the electron discharge. The plates 20 may be subjected to electron bombardment such as by electrons from the cathodes 21 which are positioned between alternate pairs of the plates 20. Between each of the other alternate pairs of plates 20 I provide a planar anode 22 which may be of wire mesh suitably supported in a plane parallel with the plates 20 to generate fields which attract the electrons from the cathodes 21. The plates 20 are preferably perforated to allow the field from the anodes 22 to penetrate the plates and draw the electrons toward the plates. The cathodes may be of any form but are shown as of the filamentary type comprising parallel wires coated with electron emitting material such as barium and/or strontium oxides which, when heated to a suitable temperature, liberate electrons which are directed toward and upon the phosphor plates 20 by the anodes 22. The filament wires may be supported by current carrying conductors 23 which in turn may serve as spacers for the alternate pairs of plates 20, whereas the other alternate pairs of plates are supported by the insulators 24. The device shown in Figs. 5 and 6 is suitable for use with high potential sources of either the direct or alternating type, the potential source being connected between the cathodes 20 and anodes 22 and represented as H. V. in Fig. 5. The thickness of the phosphor sheets 20 is so chosen in relation to the voltage applied between the cathodes and anodes that the energy of the electrons is completely absorbed. While the plate type of solid phosphor shown in Figs. 5 and 6 is particularly suited for electron discharge excitation, it is to be understood that this form may likewise be used in combination with other types of excitation, whether they be of the corpuscular or radiant energy type.

Further in accordance with my invention I excite ultra violet emission in a transparent phosphor body such as by very short ultra violet radiation and utilize the ultra violet emission from the body to excite visible light in a phosphor having a high energy absorption characteristic and luminescent activity to the excited ultra violet light. The ultra violet emission from the body is thus allowed to excite visible light, that is, light of a longer wave length. For example, ultra violet emission from electron discharge excited luminescent materials such as aluminum oxide, beryllium silicate or other suitable phosphor will excite visible radiation from manganese activated zinc silicate, silver activated zinc sulfide or zinc cadmium sulfide. Since the index of refraction of solids normally increases with decreasing wave length of light, the critical angle of reflection decreases with decreasing wave length; or the glacing angle of reflection increases with decreasing wave length. Therefore, if the long transparent bodies such as the rods 7, cylinders 11—15 or sheets 20 of ultra violet emitting phosphor be excited along their length by an electron discharge, X-rays or other suitable excitation means, more of the volume of the body will be contributing rays falling within the glancing angle for total reflection than would be true if the phosphor body were emitting light of a longer wave length. By increasing the length of the plates or bodies of other shape, such as the rods or cylinders, the cumulative effect of excitation along the entire length may be utilized by projecting the light from the ends of the bodies, thereby attaining very high radiant energy concentrations. The efficiency of the lamp for concentrated beams such as through the window 9 of Fig. 1 is thereby increased, making possible the attainment of higher light intensities with shorter lengths of the lamp.

I have found that luminescent materials do not become saturated under ultra violet excitation. Thus the saturation limit of light output to ultra violent energy input is very high. Therefore, in accordance with my invention I provide means to generate ultra violet light having high intrinsic energy levels and utilize this ultra violet light to excite either solid single crystal transparent bodies of phosphor or a conventional phosphor screen composed of finely divided phosphor particles. Referring again to Fig. 5 which shows my lamp adapted to electron excitation, the plurality of transparent phosphor sheets 20 may be of a material such as aluminum oxide or beryllium silicate excitable by an electron discharge as described above. A conventional fluorescent screen, not shown, is provided on the inner wall 25 of the window 9 and in a plane substantially perpendicular to the longitudinal axes of the sheets 20. This fluorescent screen may be a single crystal phosphor body or the rods, cylinders or sheets previously described may be used, and it is to be understood that the screen, either of the conventional type or single large crystal type, may be located outside the envelope, provided the window 9 is transparent to the radiant energy liberated by the sheets 20. While I have described this modification of my invention in connection with the showing of Fig. 5, extremely short wave length ultra violet light may be excited in a discharge tube of the types shown in Figs. 1 and 3 using an ionizable medium such as neon, argon, helium or tellurium. A conventional fluorescent screen or solid phosphor bodies having high energy absorption and luminescent activity to this extremely short ultra violet light may then be used either within or without the envelope of the lamps of Figs. 1 and 3, as described in connection with Fig. 5, to generate visible light of high intrinsic brilliance from the ultra violet radiation. The fluorescent screen or solid phosphor bodies on or adjacent the wall 25 are of a material which under ultra violet radiation is excitable to produce visible luminescence and may comprise materials such as zinc or zinc beryllium silicate manganese activated, silver activated zinc sulfide or zinc cadmium sulfide or other fluorescent material having a high energy absorption characteristic and luminescent activity to ultra violet rays. As indicated above, the sheets 20 may be excited by a number of forms of excitation, but I have shown in Fig. 5 the electron discharge means previously described as the excitation source. All forms of corpuscular energy excitation are suitable, and radiant energy such as X-rays, alpha rays or very short ultra violet rays may be used as the source of excitation, provided this energy is of a higher frequency than the ultra violet light to be emitted by the sheets 20.

As indicated above, my new luminescent lamp may be used simultaneously as a directional and nondirectional source, the latter application preferably utilizing means to reflect the light in a direction parallel with the axes of the rods, cylinders or sheets of single crystal phosphor materials. Considerable increase in effective light output may be obtained by depositing light reflecting material directly on the ends of the phosphor bodies, such as on the ends of the rods 7 opposite the window 9 in Fig. 1. Thus the ends of the rods may be silvered or coated with light reflecting films of other metals or light reflecting materials which prevent scattering of the light over the space between the phosphor bodies and any light reflecting film which may be on the wall of the lamp, such as the layer 10 of Fig. 1. In the former application, namely for nondirectional lighting, the rods, cylinders or sheets may be coated so as to be light reflective at each end, and the exterior surface of the bodies roughened to increase the nondirectional properties, whereas for directional lighting it is desirable to have the exterior surface smooth and highly polished to increase the light totally internally reflected along the length of the bodies.

While I have described my invention with reference to the use of solid transparent phosphor bodies with means to excite the bodies to luminescence, such as a discharge in a gas or vapor or by ultra violet light, it is also within the scope of my invention to excite such a luminescent body by radio-active material. Thus a single transparent single crystal phosphor rod or body of other shape may be excited by emanations from radio-active salts such as mesa-thorium chloride or radium chloride. A single rod or a plurality of rods of material having high energy absorption characteristics and luminescent activity to such emanations may be coated directly with such radio-active salts and be used as a light source or lamp without any enclosing vessel whatsoever.

From the above description it will be apparent that all of the modifications of my invention utilize solid phosphor bodies which are substantially transparent. Large individual crystals of the phosphors may be grown, such as by heating a quantity of smaller crystals of the phosphor to the melting point and slowly cooling several times under high gas pressure, or the large crystals may be formed by volatilization of the smaller crystals and condensation and crystal growth as large crystals under controlled temperature and pressure. Such large crystal bodies may be grown by other methods, the principal property being that the body is transparent to the radiant energy excited therein so that the cumulative effect of excitation along the entire length and within the volume of the body may be utilized in increasing the concentration of the radiant energy.

While I have indicated the preferred embodiments of my invention of which I am now aware and have also indicated only several specific applications for which my invention may be employed, it will be apparent that my invention is by no means limited to the exact forms illustrated or the use indicated, but that many variations may be made in the particular structure used and the purpose for which it is employed without departing from the scope of my invention as set forth in the appended claims.

I claim:

1. A light source of high intrinsic brilliance including a luminescence activated elongated solid single crystal inorganic phosphor body transparent to its own luminescence emission wave length having a ratio of length to minimum dimension of at least 3 to 1 capable of accumulating luminescence along its length and directing an appreciable portion of said luminescence lengthwise of said body, said body being unobstructed at at least one end whereby light accumulated over the length thereof may be utilized as a high intensity light beam and means to excite the volume of said body to luminescence along substantially its entire length.

2. A luminescent lamp comprising an envelope, a plurality of luminescence activated elongated single crystal transparent phosphor bodies within said envelope, said bodies having a length at least three times their minimum dimension said bodies being capable of accumulating luminescence along their length and directing an appreciable portion of said luminescence lengthwise of said bodies, said bodies being unobstructed at at least one of their contiguous ends whereby light accumulated over the length thereof may be utilized as a high intensity light beam and means to excite the volume of said bodies along their length to render said bodies luminescent.

3. A light source of high intrinsic brilliance including a plurality of luminescence activated elongated solid phosphor bodies arranged substantially parallel one with another said bodies being capable of accumulating luminescence along their length and directing an appreciable portion of said luminescence lengthwise of said bodies, said bodies being unobstructed at at least one of their contiguous ends whereby light accumulated over the length thereof may be utilized as a high intensity light beam and means to excite said bodies to luminescence, said means being effective throughout substantially the entire volume and along the length of said bodies.

4. A luminescent light source including an envelope, an opaque reflective coating on the walls of said envelope with the exception of a portion thereof a plurality of elongated luminescence activated solid phosphor transparent members, said members being positioned side by side within and with their adjacent ends exposed to the said portion of said envelope with their longitudinal axes substantially parallel and means to irradiate the volume of said members with radiant energy to produce luminescence throughout the volume and along the length of said members.

5. A luminescent lamp comprising a plurality of elongated luminescence activated single crystal luminescence activated phosphor bodies having a minimum length of three times their minimum dimension, the longitudinal axes of said bodies being substantially parallel one to the other said bodies being capable of accumulating luminescence along their length and directing an appreciable portion of said luminescence lengthwise of said bodies, said bodies being unobstructed at at least one of their contiguous ends whereby light accumulated over the length thereof may be utilized as a high intensity light beam and means to excite substantially the entire volume of said bodies to luminescence throughout the length of said bodies.

6. A luminescent light source of high intrinsic brilliance comprising a plurality of transparent luminescence activated phosphor bodies having an extended elongated excitation volume of sufficient length to exhibit total internal reflection predominantly along the length of said bodies, an elongated envelope enclosing said bodies, means to prevent transmission of light through said envelope with the exception of light propagated lengthwise of said bodies, and means to excite said bodies and generate light cumulative in intensity throughout the length and volume of said bodies.

7. A luminescent lamp comprising an opaque envelope having a window portion, a plurality of closely spaced elongated single crystal transparent luminescence activated phosphor bodies having a high energy absorption characteristic and luminescent activity to ultra violet light within said envelope with their ends directly exposed to the window portion of said envelope, and means to subject the volume of said bodies to ultra violet light to excite said bodies to high luminescence in the visible portion of the spectrum.

8. A luminescent device comprising an opaque envelope having a window portion, a plurality of elongated single crystal phosphor bodies arranged side by side and parallel one to another within said envelope and with their adjacent ends exposed to the window portion of said envelope whereby luminescence excited within said bodies is propagated in the direction of said window, means to subject said bodies to radiant energy to excite said bodies to luminescence in the ultra violet portion of the spectrum and a screen of luminescent material exposed to the luminescence emanating from the said ends of said bodies, said screen having high energy absorption characteristics and luminescent activity to the ultra violet light excited in said bodies to generate luminescent light of high intrinsic brilliance in the visible portion of the spectrum.

9. A luminescent lamp comprising an opaque envelope having a transparent wall portion, a plurality of elongated activated luminescent material rods having a ratio of maximum to minimum dimension of at least 3 to 1 within said envelope and with their ends directly exposed to the transparent wall portion of said envelope, an ionizing medium within said envelope enveloping said rods and electrode means to produce a glow discharge within said envelope to excite substantially the entire surface and volume of said elongated rods to luminescence.

10. A luminescent lamp comprising an envelope having a transparent end wall, a plurality of luminescence activated elongated transparent single crystal luminescent members within said envelope with their adjacent ends directly exposed to said end wall whereby luminescence developed within said members passes through said transparent wall with substantially no obstruction, a cathode to generate electrons and means to direct said electrons against and along the length of said members.

11. A luminescent lamp comprising an envelope, a plurality of sheets of transparent luminescent material supported side by side within said envelope, means facing each side of said sheets to generate electrons and means to direct said electrons upon each side of said sheets.

HUMBOLDT W. LEVERENZ.